(12) United States Patent
Degertekin et al.

(10) Patent No.: US 8,891,334 B2
(45) Date of Patent: Nov. 18, 2014

(54) COMPACT, ENERGY-EFFICIENT ULTRASOUND IMAGING PROBES USING CMUT ARRAYS WITH INTEGRATED ELECTRONICS

(75) Inventors: F. Levent Degertekin, Atlanta, GA (US); Gokce Gurun, Smyrna, GA (US); Mustafa Karaman, Istanbul (TR); Jennifer O. Hasler, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 375 days.

(21) Appl. No.: 13/412,465

(22) Filed: Mar. 5, 2012

(65) Prior Publication Data

US 2013/0064043 A1 Mar. 14, 2013

Related U.S. Application Data

(60) Provisional application No. 61/449,261, filed on Mar. 4, 2011.

(51) Int. Cl.
| | | |
|---|---|---|
| *B06B 1/00* | (2006.01) | |
| *G01S 15/00* | (2006.01) | |
| *B06B 1/02* | (2006.01) | |
| *G01S 7/52* | (2006.01) | |
| *G01S 15/89* | (2006.01) | |
| *H04R 17/00* | (2006.01) | |

(52) U.S. Cl.
CPC .............. *B06B 1/0215* (2013.01); *G01S 7/5202* (2013.01); *B06B 1/0292* (2013.01); *G01S 15/8993* (2013.01); *G01S 7/52025* (2013.01); *G01S 15/8925* (2013.01); *H04R 17/00* (2013.01); *B06B 2201/20* (2013.01); *B06B 2201/76* (2013.01); *G01S 7/52096* (2013.01)
USPC ......................................... 367/137

(58) Field of Classification Search
USPC ......................................................... 367/137
See application file for complete search history.

(56) References Cited

U.S. PATENT DOCUMENTS

| | | | | |
|---|---|---|---|---|
| 4,372,323 | A | * | 2/1983 | Takemura et al. ............ 600/447 |
| 4,890,267 | A | * | 12/1989 | Rudolph ....................... 367/103 |
| 5,744,898 | A | | 4/1998 | Smith et al. |
| 6,645,145 | B1 | | 11/2003 | Dreschel et al. |
| 6,945,115 | B1 | | 9/2005 | Wang |
| 7,549,962 | B2 | | 6/2009 | Dreschel et al. |
| 7,892,175 | B2 | * | 2/2011 | Wakabayashi et al. ........ 600/437 |
| 2007/0167811 | A1 | | 7/2007 | Lemmerhirt et al. |
| 2007/0167812 | A1 | | 7/2007 | Lemmerhirt et al. |
| 2007/0167814 | A1 | * | 7/2007 | Wakabayashi et al. ........ 600/459 |
| 2008/0269614 | A1 | | 10/2008 | Adachi et al. |
| 2009/0112133 | A1 | * | 4/2009 | Deisseroth et al. ............... 601/3 |
| 2009/0182229 | A1 | * | 7/2009 | Wodnicki ....................... 600/437 |
| 2009/0182233 | A1 | * | 7/2009 | Wodnicki ....................... 600/443 |

(Continued)

*Primary Examiner* — Isam Alsomiri
*Assistant Examiner* — James Hulka
(74) *Attorney, Agent, or Firm* — Troutman Sanders LLP; Ryan A. Schneider; Dustin B. Weeks

(57) ABSTRACT

A CMUT on CMOS imaging chip is disclosed. The imaging chip can use direct connection, CMOS architecture to minimize both internal and external connection complexity. Intelligent power management can enable the chip to be used for various imaging applications with strict power constraints, including forward-looking intra-vascular ultrasound imaging. The chip can use digital logic to control transmit and receive events to minimize power consumption and maximize image resolution. The chip can be integrated into a probe, or catheter, and requires minimal external connections. The chip can comprise integrated temperature control to prevent overheating.

26 Claims, 11 Drawing Sheets

(56) References Cited

U.S. PATENT DOCUMENTS

| | | | |
|---|---|---|---|
| 2009/0187099 A1* | 7/2009 | Burcher | 600/430 |
| 2009/0250729 A1 | 10/2009 | Lemmerhirt et al. | |
| 2009/0326374 A1* | 12/2009 | Naruse | 600/443 |
| 2010/0020645 A1* | 1/2010 | Wodnicki et al. | 367/155 |
| 2010/0049052 A1* | 2/2010 | Sharf et al. | 600/454 |
| 2010/0063397 A1 | 3/2010 | Wagner | |
| 2010/0160784 A1* | 6/2010 | Poland et al. | 600/453 |

* cited by examiner

COMPACT, ENERGY-EFFICIENT ULTRASOUND IMAGING PROBES USING CMUT ARRAYS WITH INTEGRATED ELECTRONICS

CROSS-REFERENCE TO RELATED APPLICATIONS AND PRIORITY CLAIM

This application claims priority under 35 U.S.C. §119(e) to, and the benefit of, U.S. Provisional Patent Application No. 61/449,261, entitled "Systems and Electronics for Forward-Looking Intravascular and Intracardiac Ultrasound Imaging Probes using CMUT Arrays with Integrated Electronics," filed 4 Mar. 2011. The entirety of the above-mentioned application is hereby incorporate by reference as if set forth in its entirety below.

BACKGROUND OF THE INVENTION

1. Field of the Invention

Embodiments of the present invention relate to ultrasound imaging probes, and particularly, to flexible, single chip, CMUT based ultrasound imaging probes using monolithically integrated CMUT arrays on CMOS electronics.

2. Background of Related Art

Side-looking intravascular ultrasound ("IVUS") imaging probes exist that provide relatively high resolution images of tissue and fluid. This can be useful, for example, when inspecting the inside surfaces of vessels or tissues immediately surrounding the vessel. Similarly, intracardiac echocardiography ("ICE") probes also exist which use one-dimensional (1-D) imaging arrays.

Unfortunately, current commercial IVUS imaging systems offer only side-looking capabilities and cannot generate images of, for example, the volume in front of the catheter. ICE probes, for example, provide only two-dimensional cross sections, but not volumetric images. The ability to image fluid and/or tissue directly in front of the probe can be useful in a number of applications. An IVUS catheter that can provide forward-looking volumetric ultrasound images would be a valuable clinical tool for, for example and not limitation, guiding interventions in coronary arteries, for the treatment of chronic total, or near-total, vascular occlusions, and for stent deployment.

In order to navigate tortuous arteries and coronary structures, for example, an important aspect of IVUS and ICE probes is the size and flexibility of the probes. As a result, the rigid section of the probe close to the imaging tip should be as short as possible. Current ultrasound array probes used for these purposes are rigid over several mm, limiting their maneuverability.

Similarly, for flexibility, the number of electrical connections connecting the probe to the back end imaging system should also be limited. In other words, a larger number of cables make the catheter less flexible. The number of external connections is also important, for example, because excessive external connections increase probe size and manufacturing cost and complexity.

In addition, to enable the probe to enter small areas (e.g., blood vessels), for example, the frontal area of the probe must be limited. To obtain the better resolution given the limited area of the probe, however, the array elements are preferably placed around the periphery of the frontal probe area. Furthermore, if possible, the transmit and receive array elements should be separate to achieve high signal to noise ratio. This is because when the same element is used for both transmit and receive functions some protection circuitry needs to be implemented, increasing the electronics noise of the system.

As a result, forward-looking, highly flexible IVUS probes that would generate full volumetric images in front of the catheter have not been feasible using conventional technology. There are IVUS catheters that use a single rotating transducer angled from the normal from the vessel wall, but these provide images only on a conical surface, not the 3-D volume.

In addition to size and flexibility constraints, ultrasound probes typically must limit their power consumption When the probe is activated, the temperature of the probe must be limited to prevent damage to tissue, or simply to prevent the probe from overheating when in open air. In some instances, for example, the probe may remain active outside the body. In this instance, power consumption should be limited to prevent the probe electronics from overheating and damaging the mechanical structure of the probe such as the adhesion layers.

What is needed, therefore, is a single chip, flexible, forward-looking ultrasonic probe. The probe should comprise reduced power consumption through electronics design and intelligent power control. The probe should comprise improved resolution with minimal cross-sectional area. The probe should comprise temperature feedback and control. It is to such an ultrasonic probe that embodiments of the present invention are primarily directed.

SUMMARY OF THE INVENTION

Embodiments of the present invention relate to ultrasound imaging probes and particularly to forward-looking, energy-efficient ultrasound imaging probes with onboard electronics. Embodiments of the present invention enable improved imaging with reduced energy consumption, temperature control, and reduced probe cross-section.

Embodiments of the present invention can comprise a CMUT on CMOS chip for imaging applications. The CMOS chip can comprise a plurality of CMUT transmit elements and associated driving circuitry, a plurality of CMUT receive elements and associated detection circuitry, and a digital control unit. In some embodiments, the digital control unit can cycle the plurality of transmit elements on and off in a first sequence and the plurality of receive elements on and off in a second sequence. The digital control unit can cycle the transmit and receive elements on and off until a predetermined number of transmit and receive elements have been cycled. In some embodiments, the digital control unit can comprise a multi-bit counter.

In some embodiments, the first sequence can cycle through the plurality of transmit elements one at a time. In other embodiments, the first sequence can cycle through the plurality of transmit elements two or more at a time. In some embodiments, the second sequence can cycle through the plurality of receive elements four at a time. In other embodiments, the second sequence can cycle through the plurality of receive elements two or more at a time. In still other embodiments, the second sequence can cycle through the plurality of receive elements two or more at a time and all the receive electronics for non-selected receiver elements can be turned off.

In some embodiments, the predetermined number of cycles is reached when all of the transmit and receive elements have been cycled on and off. In other embodiments, the predetermined number of cycles is reached when between approximately 10 to 80 percent of the transmit and receive elements have been cycled on an off. In some embodiments, the chip can comprise 13 or fewer external connections for data input, data output, and power. In other embodiments, the chip can comprise eight or fewer external connections for data input, data output, and power.

In some embodiments, the chip can further comprise a temperature sensor and a switch. In some embodiments, when the temperature sensor reaches a predetermined temperature, the switch can interrupt power to the CMOS chip to prevent overheating. In a preferred embodiment, the switch is a MOS transistor.

Embodiments of the present invention can also comprise a CMUT on CMOS chip for imaging applications comprising a CMOS chip. In some embodiments, the CMOS chip can comprise a first ring comprising a plurality of CMUT transmit elements disposed proximate an outer edge of the CMOS chip, a second ring comprising a plurality of CMUT receive elements disposed proximate the outer edge of the CMOS chip, and a digital control unit. In some embodiments, the digital control unit can activate the CMUT transmit elements one at a time to transmit an ultrasonic signal. In other embodiments, the digital control unit can activate the CMUT receive elements in groups to receive the ultrasonic signal. In some embodiments, the imaging cycle is complete when a predetermined number of transmit and receive elements have been activated.

In some embodiments, first ring is disposed outside the second ring. In other embodiments, the second ring is disposed outside the first ring. The CMUT receive elements can be activated in groups of four or more.

Embodiments can also comprise a method for providing energy-efficient ultrasound imaging. In some embodiments, the method can comprise providing a CMOS chip, cycling the plurality of transmit elements on and off in a first sequence, and cycling the plurality of receive elements on and off in a second sequence. In some embodiments, an imaging cycle can be complete when a predetermined number of transmit and receive elements have been activated.

In some embodiments, the first sequence can cycle the transmit elements on and off one at a time. In other embodiments, the second sequence can cycle the receive elements on and off two or more at a time. In still other embodiments, the second sequence can cycle the receive elements on and off four at a time. In some embodiments, the predetermined number of cycles can be reached when all of the transmit and receive elements have been cycled on and off. In other embodiments, the predetermined number of cycles can be reached when approximately 10 to 80 percent of the transmit and receive elements have been cycled on and off.

Embodiments of the present invention can also comprise a method comprising sensing the temperature of the CMOS chip with a temperature sensor, and turning the receive elements, the transmit elements, or both, off at a predetermined temperature. In some embodiments, the predetermined temperature can be between 35 and 50 degrees Celsius. In a preferred embodiment, the predetermined temperature is approximately 42 degrees Celsius.

These and other objects, features and advantages of the present invention will become more apparent upon reading the following specification in conjunction with the accompanying drawing figures.

DETAILED DESCRIPTION

Embodiments of the present invention can comprise an ultrasound imaging probe with optimized electronics, intelligent control, and improved architecture. Embodiments of the present invention provide improved image resolution, power management, and temperature control. This can be achieved using a multi-faceted approach including, but limited to, careful selection of probe electronics, intelligent power and data management, and improved CMUT on CMOS architecture. As mentioned above, an important step in realizing forward-looking ("FL") ultrasonic arrays is the design and implementation of the electronics that will accomplish the transmit and receive tasks in a small area and with low power without compromising the performance. To this end, CMUT on CMOS electronics can be devised to improve packaging and reduce energy consumption.

To simplify and clarify explanation, the system is described below as a system for intravascular ultrasound imaging. One skilled in the art will recognize, however, that the invention is not so limited. The system can also be deployed for other ultrasound imaging applications, particularly when a small catheter cross-section is desired. The system can also comprise an energy efficient, miniaturized chip for ultrasound imaging.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

As mentioned above, a problem with current intravascular ultrasound (IVUS) imaging systems is that they offer only side-looking capabilities and cannot generate images of the volume in front of the catheter. A forward-looking intravascular ultrasound ("FL-IVUS") probe, however, could be used for guiding various coronary arteries treatments including, but not limited to, stent and angioplasty location. It is to such a catheter that embodiments of the present invention are primarily directed.

Figure 1:
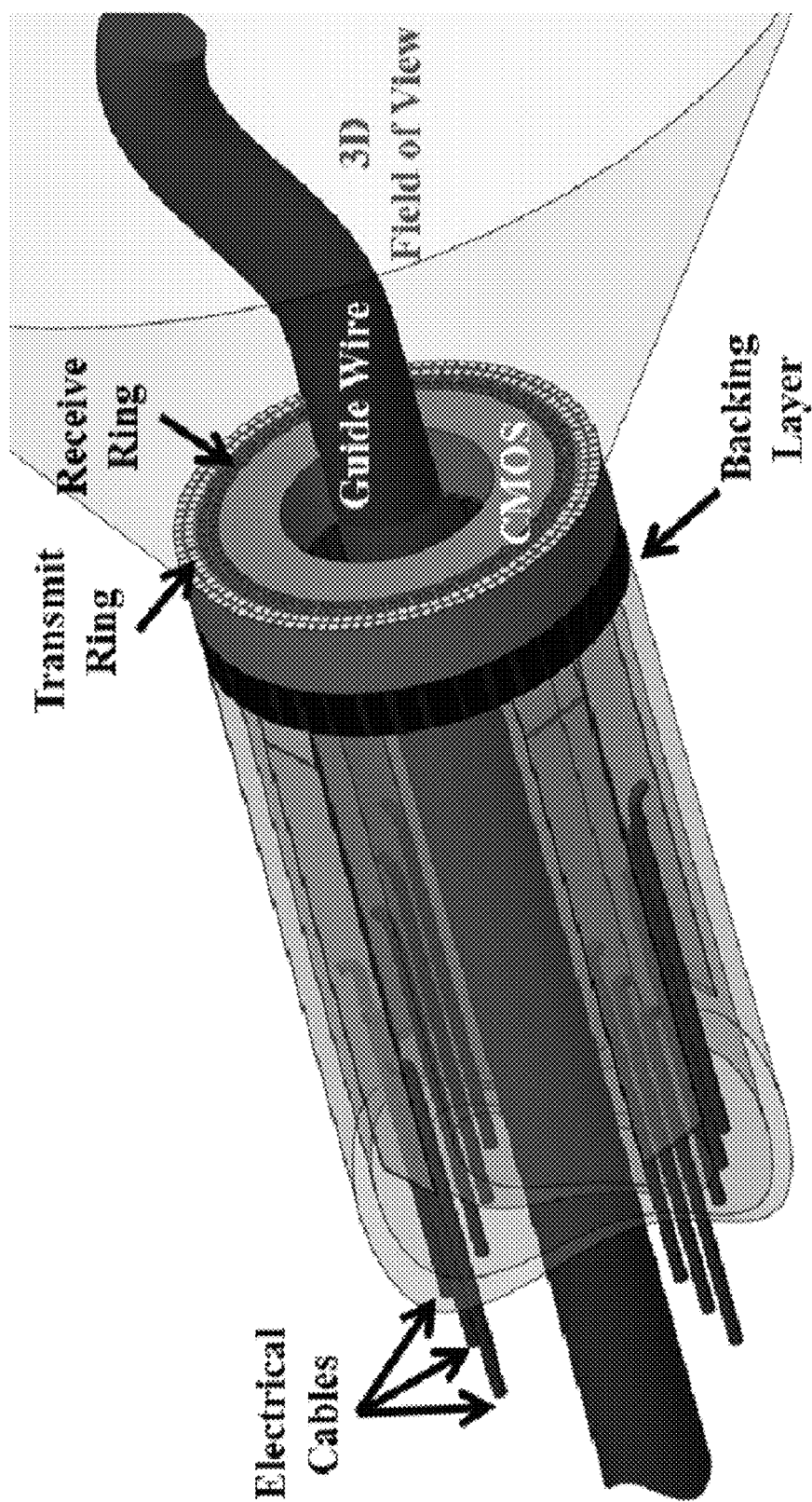
FIG. 1 depicts a forward-looking ultrasound catheter, in accordance with some embodiments of the present invention.

Successful realization of FL-IVUS imaging catheters requires close integration of front-end electronics and the transducer array, intelligent component selection, and intelligent power and data control, among other things. Compared to a multi-chip integration scheme, for example, which requires multiple chip-to-chip interconnects, embodiments of the present invention can comprise a system for integrating a transducer array with receive and transmit electronics on a single chip. As shown in FIG. 1, a single chip is advantageous because it requires significantly fewer connections than its multi-chip counterpart. This can significantly mitigate, for example, the interconnection complexity and difficulties in the manufacturing of the FL-IVUS probe. In addition, the miniaturized single-chip FL-IVUS system can be so thin (e.g., approximately 1 mm) that it can be flexible enough to navigate tortuous arteries.

Single-chip integration can reduce interconnect complexity significantly and can enable significant miniaturization of IVUS arrays. A single-chip FL-IVUS system can be based on a front-end integrated circuit ("IC") implemented on a CMOS that is, in turn, integrated with a CMUT array using CMUT-on-CMOS technology. In some embodiments, the IC can incorporate a pulser capable of generating high-voltage (e.g., 25V) pulses and a low-noise receiver transimpedance amplifier dedicated to each of multiple transmit and receive ultrasonic CMUT array elements, respectively. In some embodiments, the chip can also include digital control circuitry designed to synchronize the transmitting and receiving sequence during data acquisition.

The circuitry can be sized to fit, for example, into a small diameter silicon donut to enable insertion of the probe into, for example, very small arteries and veins. In a preferred embodiment, the donut can comprise a gap for a guide wire to facilitate this application. In an exemplary embodiment, the single-chip FL-IVUS system can comprise only 13 external connections, while providing four parallel receive outputs. The average power consumption of the chip is reduced to significantly by turning off unused receive amplifiers using digital logic, among other things.

I. Receiver Amplifier Design

Significant improvements in probe size, effectiveness, and energy consumption can be made through careful selection of various components. As described below, therefore, various components can be evaluated and compared based on certain design criteria. In this manner, the components chosen can enable the probe to meet certain design parameters (e.g., overall size), while still providing the desired performance (e.g., resolution).

Preamplifier Designs

The first of these maximizing design choices can be preamplifier design. In some embodiments, therefore, multiple amplifiers can be tested and the performance of each can be compared in terms of, for example and not limitation, sensitivity, noise, and dynamic range. In a preferred embodiment, the various amplifier architectures can be compared using amplifiers designed with equal area and power consumption.

Resistor-Feedback TIA Design

Figure 2:
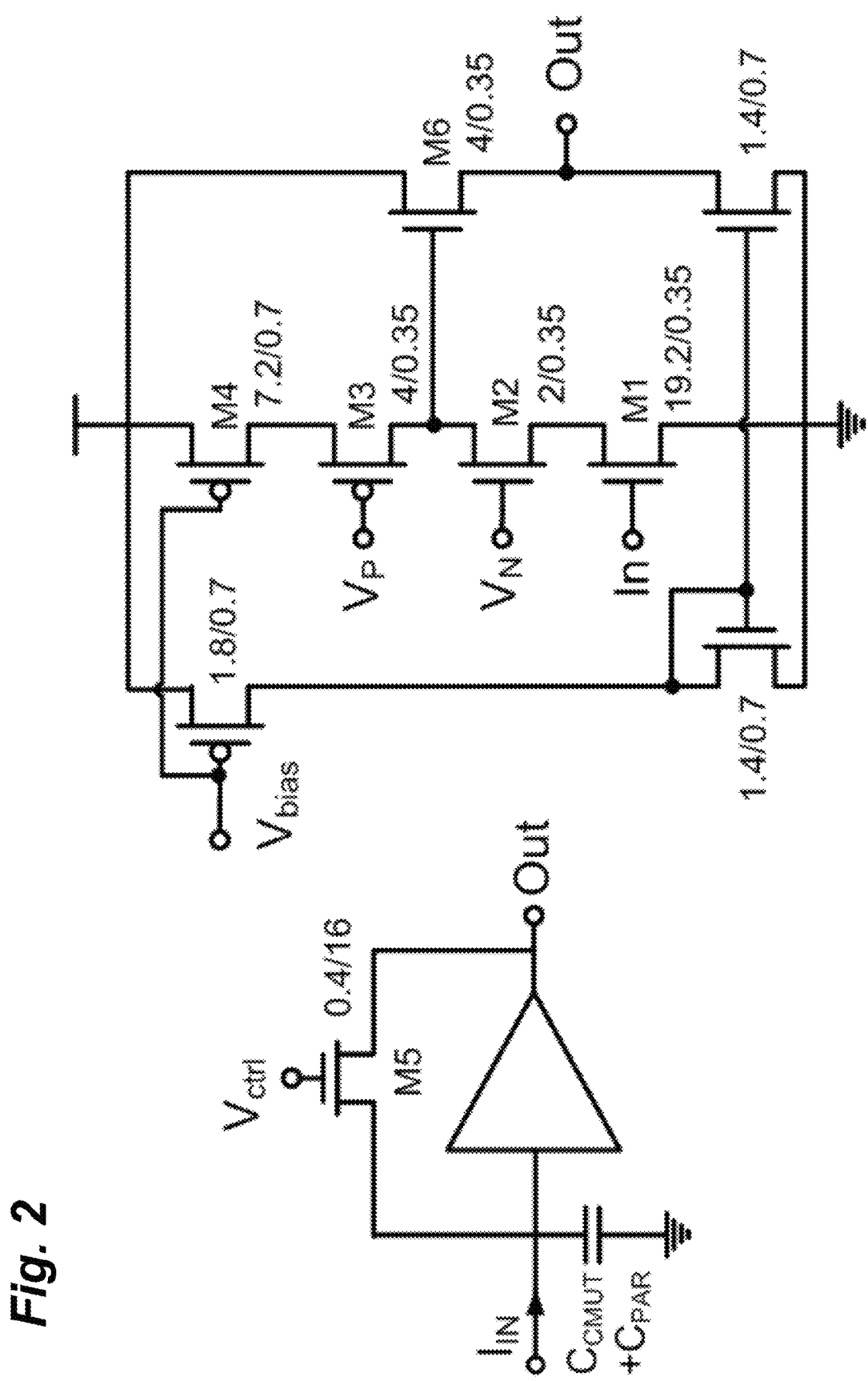
FIG. 2 is a schematic of a resistor feedback transimpedance amplifier ("TIA"), in accordance with some embodiments of the present invention.

As shown in FIG. 2, in some embodiments, a resistive-feedback transimpedance amplifier ("TIA") design, i.e., one in which the feedback resistance is implemented with a transistor in triode region, can be used. In this configuration, one important design choice, designed to minimize the input referred noise of the amplifier, is the sizing of the input transistor. For ease of discussion, the preamplifier noise terms in the total input-referred current noise expression can be shown as:

$$\overline{i_{in,TIA}^2} = \omega^2 (C_{IN,AMP} + C_{PAR} + C_F + C_{CMUT})^2 \frac{4kT\gamma}{g_m} + \frac{4kT}{R_F} \quad (1)$$

In this expression, $\gamma$ is the thermal excess noise factor of the process technology, $C_F$ is the parasitic feedback capacitance, $C_{PAR}$ is the parasitic interconnect capacitance at the input, and $C_{IN,AMP}$ is the core amplifier input capacitance. The transconductance of the input transistor that dominates the core amplifier noise is noted as $g_m$. From Eq. (1), therefore, it is apparent that increasing the width of the input MOS transistor size increases the $g_m$ and reduces the voltage noise (i.e., $4kT\gamma/g_m$) for this type of TIA. Increasing the width of the input MOS transistor, on the other hand, results in a larger $C_{IN,AMP}$, which increases the noise.

As a result, there is an optimum input transistor width that minimizes the core-amplifier related input-referred noise. To minimize the core-amplifier noise related term, therefore, the $(C_{IN,AMP} + C_{PAR} + C_F + C_{CMUT})^2/g_m$ term which is proportional to $(C_{IN,AMP} + C_{PAR} + C_F + C_{CMUT})^2/C_{IN,AMP}$ should be minimized. Thus, the minimum value is achieved when the amplifier input capacitance matches the sensor capacitance plus the parasitic capacitance at the input:

$$C_{IN,AMP} = C_{PAR} + C_F + C_{CMUT} \quad (2)$$

It should be noted, however, that in this derivation the dependence of the noise of the $R_F$ term on $C_{IN,AMP}$ is not taken into account. This is because the value of $R_F$ is not independent of $C_{IN,AMP}$ because of the bandwidth tradeoff between the feedback resistance ($R_F$) and the total input capacitance. It has been shown, however, that the optimum bandwidth is at a point where the input capacitance introduced by the core amplifier is smaller than the total of the CMUT capacitance and the interconnect parasitic capacitance. In a preferred embodiment, therefore, the TIA input transistor is sized such that the input capacitance of the amplifier (in this case, approx. 40 fF) is less than the capacitance of the total FL-CMUT array element (in this case, approx. 90 fF). Of course, these values will vary depending on, among other things, the FL-CMUT array used.

Figure 3A:
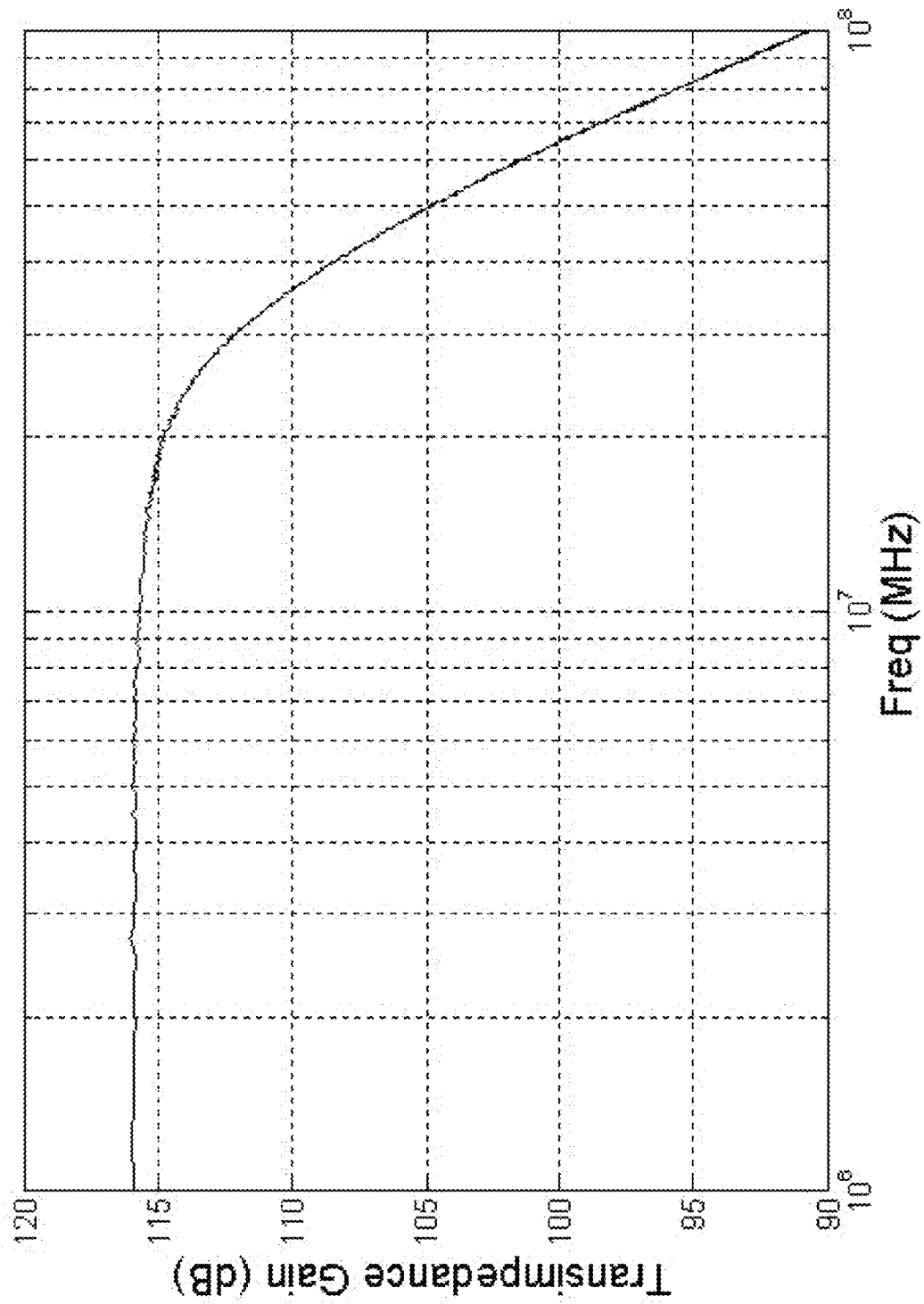
FIG. 3a is a graph depicting the gain and bandwidth for the TIA of FIG. 3, in accordance with some embodiments of the present invention.
Figure 3B:
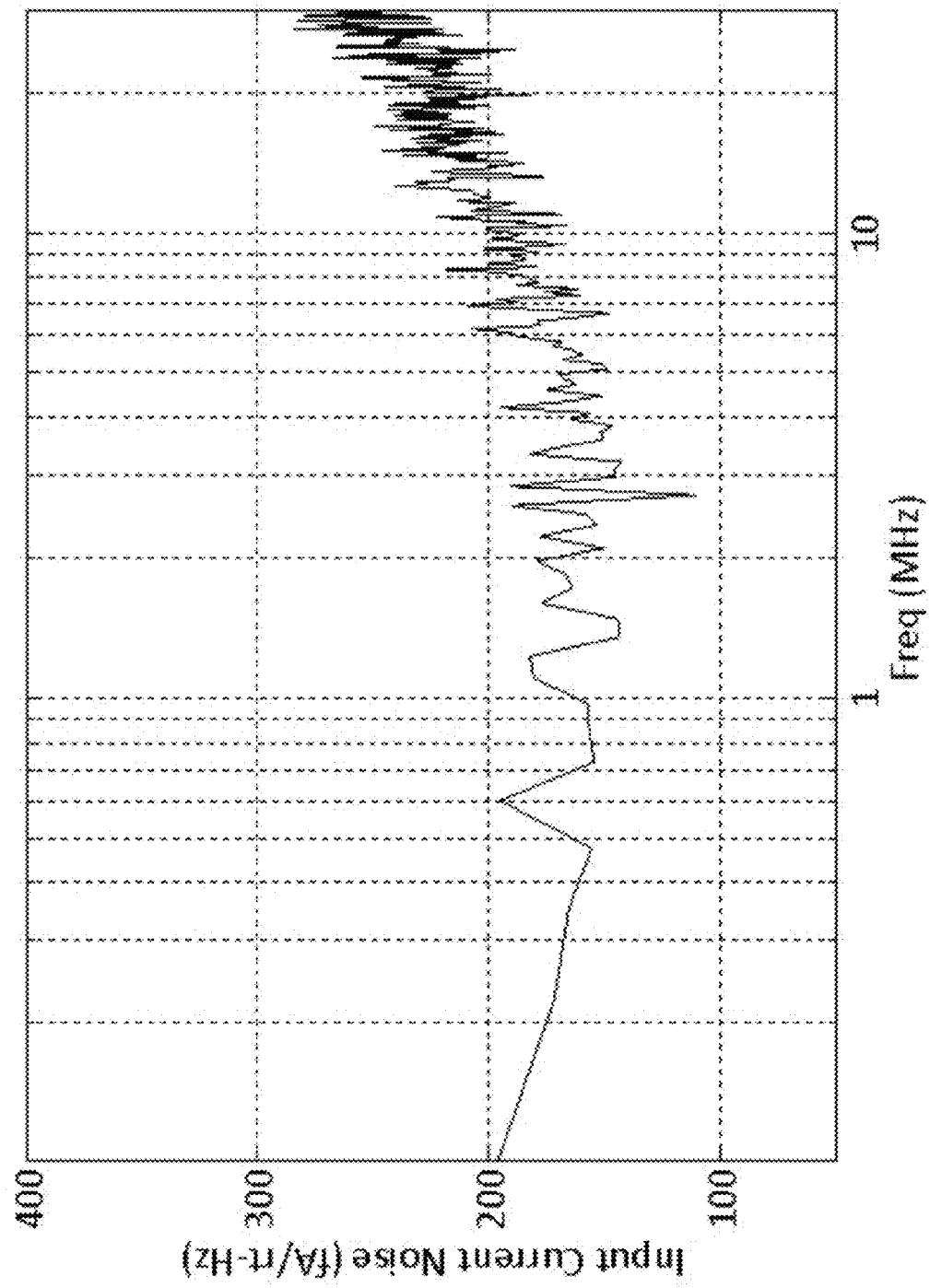
FIG. 3b is a graph depicting the input referred noise for the TIA of FIG. 3, in accordance with some embodiments of the present invention.

FIG. 3a is a graph that depicts the measured results of the amplifier, which demonstrated a gain of 630 kΩ with a 25 MHz bandwidth. Note that, as discussed above, the transimpedance gain measurements of the amplifiers are performed using a CMUT capacitance, which is assumed to be 90 fF. FIG. 3b, on the other hand, plots the measured total input-referred current noise of the amplifier. This figure is obtained by dividing the measured output noise by the transimpedance gain of the amplifier. As shown, the measured input-referred current noise at the 20-MHz center frequency is 220 fA/√Hz. The dynamic range is found to be 50 dB using the integrated noise value within the 15 to 25 MHz CMUT band. This TIA consumes a 25×55 µm area and 240 µA current from a 3.3-V supply, i.e. about 0.8 mW.

High-Voltage Pulser

Figure 4:
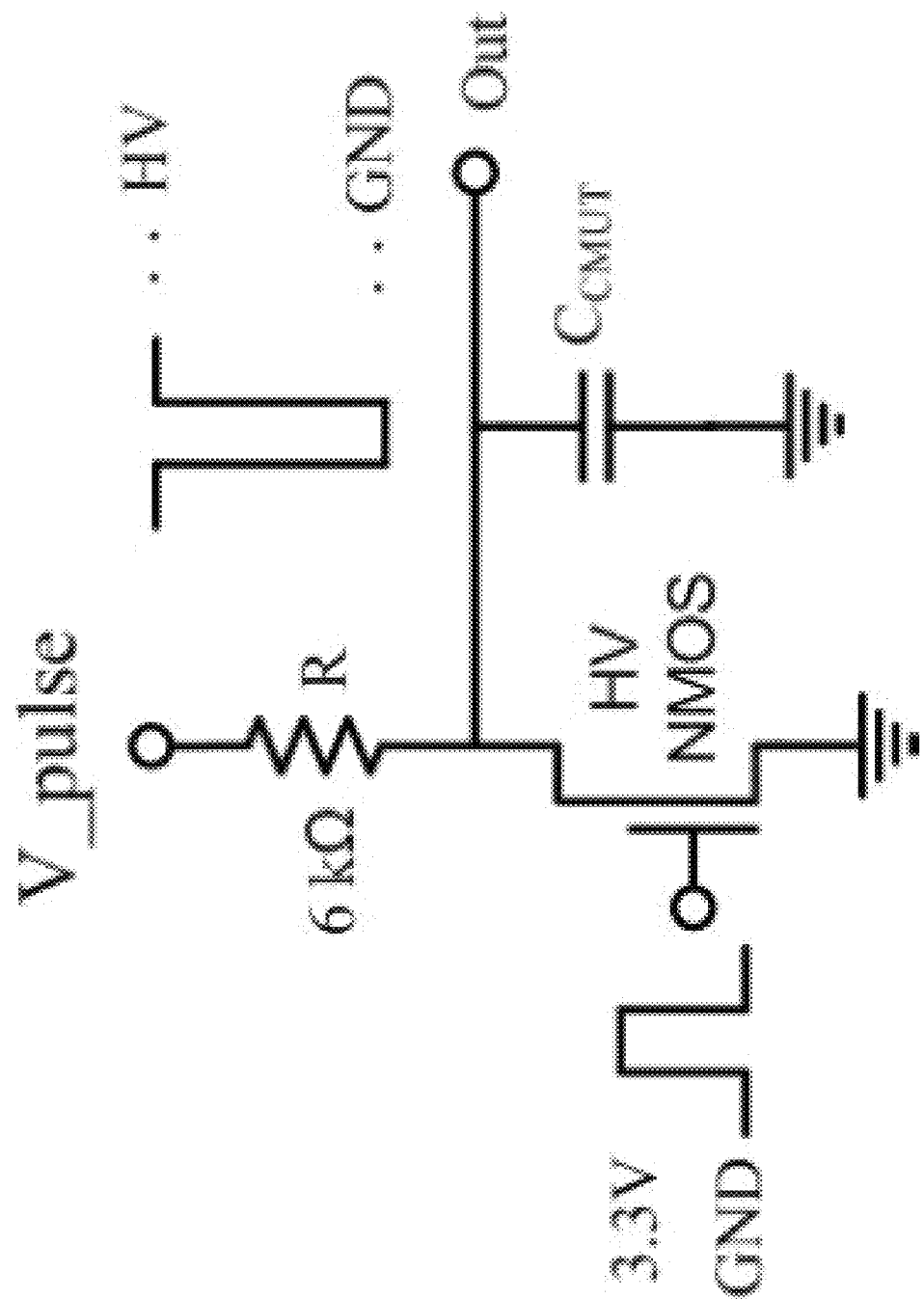
FIG. 4 is a schematic of a high-voltage NMOS pulser circuit, in accordance with some embodiments of the present invention.

Using standard CMOS technology, the breakdown voltages of most devices is approximately 10 volts or less. In a preferred embodiment of the present invention, however, higher pulse voltages are needed for improved image quality and penetration. In some embodiments, therefore, to achieve higher pulse voltages a high-voltage NMOS based on an "extended drain" design approach can be used. FIG. 4 depicts a schematic of the pulser circuit that can be implemented on-chip and is based on a high-voltage NMOS design.

Figure 5:
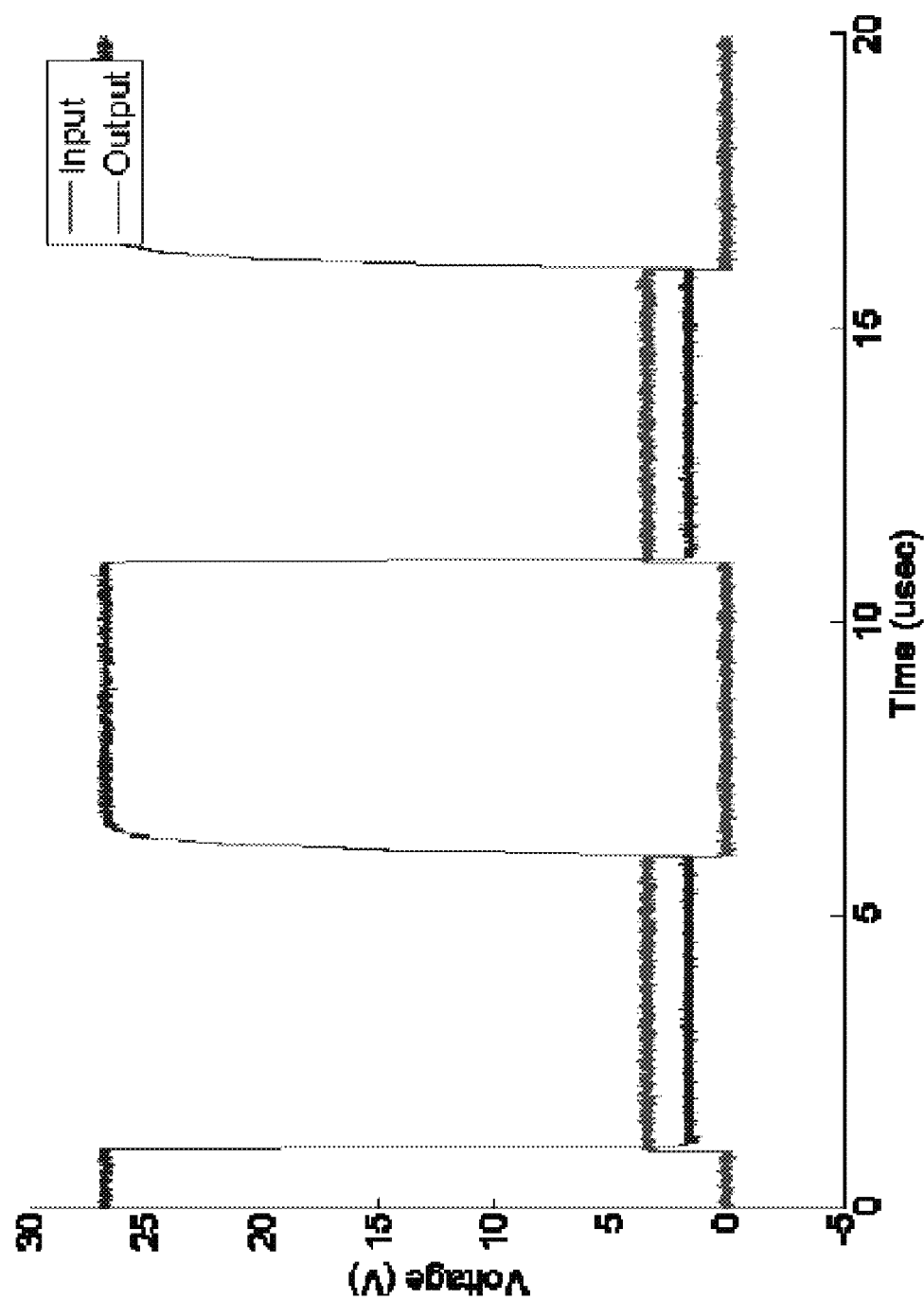
FIG. 5 is a graph depicting the pulse from the pulser circuit of FIG. 7, in accordance with some embodiments of the present invention.

In some embodiments, the pulser can convert the 3.3-V unipolar input pulse generated by a digital control logic, discussed below, into a unipolar high-voltage pulse. The width of the output pulse, on the other hand, can be controlled by the width of the low-voltage trigger pulse. To reduce overall power consumption, the steady state voltage of the output pulser can be kept at high voltage. In this manner, when the input trigger pulse arrives, the output switches from high to low. As shown in FIG. 5, the output pulse from the pulser is approximately 25 V (2 V to 27 V). In this graph, the trigger signal is a 100-kHz, 3.3-V square wave.

It is not possible to directly measure the speed of the output pulse because of the capacitive loading of the cable and the scope used in the measurements, among other things. The speed for the CMUT loading case can nonetheless be estimated using calculations. The various system capacitances can be calculated and other interconnect parasitic capacitances can be eliminated by monolithic integration. In addition, both the rise and fall times of the pulse improve proportionally with the reduced loading capacitance. Therefore, the rise and fall times for the CMUT loading case can be approximated as 1.5 ns and 0.5 ns, respectively, by projecting the rise and fall time values for the expected range of loading capacitance of the monolithic CMUT connection. In this configuration, therefore, the pulser design can generate a pulse with a pulse width as narrow as 2.0 ns. This is more than sufficient to drive the 20-MHz center-frequency CMUT element. In addition, each pulser is very compact and consumes approximately 35×50 µm².

In some embodiments, to eliminate a dedicated external connection, the low-voltage pulse trigger signal can be generated through the Clk input. See, FIG. 10. The Clk signal can, for example, be internally delayed for approximately 10 ns and then routed to the active pulser circuitry with the digital logic. The 10-ns delay is long enough for the switching transient to settle, which ensures that the intended pulser is properly selected. Note that, the pulse width of the low-voltage Clk input also determines the width of the output pulse.

In an alternative embodiment, the pulse can be provided externally to the IC. One advantage of providing the pulse trigger externally is that the counter clock can generally be run faster than the pulse trigger signal. In addition, some of the transmitter-receiver pairs can be skipped without pulsing. This can enable, for example, collecting a reduced dataset by collecting a reduced number of overall samples or collecting data from a reduced number of Tx/Rx pairs. The former enables, for example, faster data collection by reducing the total number of firings, while maintaining the overall quality of each image. This enables faster data collection reducing the image resolution loss due to tissue motion.

II. Intelligent Energy and Data Management

In addition to the careful selection of components, embodiments of the present invention also relate to the intelligent control of both energy consumption and data flow. In this manner, various components can, for example, be powered on and off to conserve energy. Similarly, data pathways can be used for multiple duties using, for example, digital switching, resulting in both a reduction in chip size and a reduction in the number of external connections required.

Digital Control

In some embodiments, a digital control block can be used to synchronize the operation of the Tx and Rx elements in the array. In some embodiments, during the initial pulsing stage, for example, a single transmitter can pulse. During the receive sequence, on the other hand, four receive amplifiers can be connected to the outputs. In this manner, the digital block can control, for example, which of the four amplifiers are the active receivers and which particular pulser is the active transmitter at any given time. In some embodiments, the digital block can change the active elements during data collection with a single clock. As discussed below, in this configuration, the data collection process for a single image completes in 1024 clock cycles.

Figure 6:
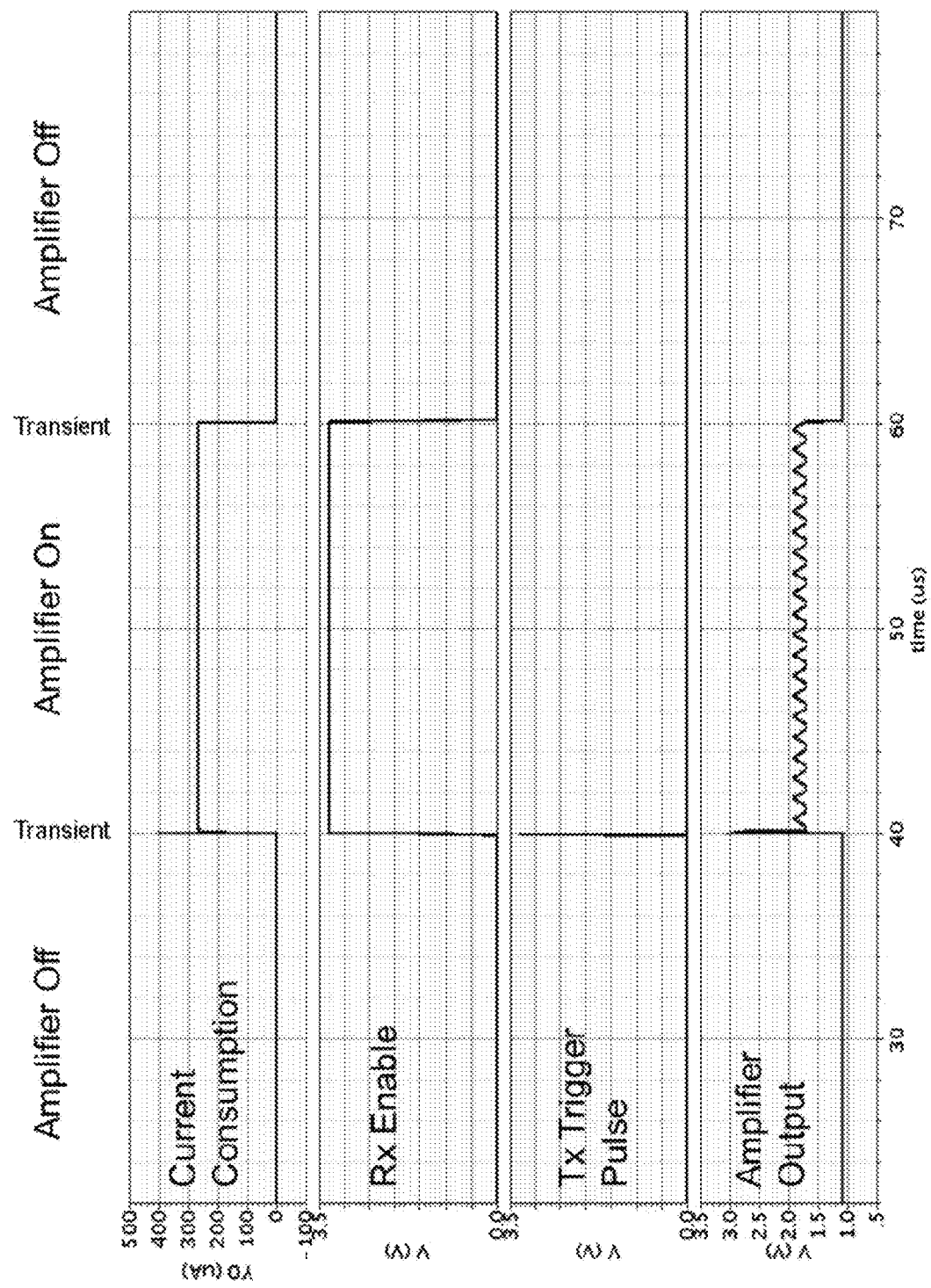
FIG. 6 is a graph depicting a simulated timing diagram for power control, in accordance with some embodiments of the present invention.

FIG. 6 depicts a simulated timing diagram depicting the operation flow for the power control, in some embodiments. The Transmit trigger signal, for example, is generated approximately 10 ns after the receiver is enabled. In this figure, the pulse repetition rate is 20 µs and the pulse width is 20 ns, which approximates normal operating conditions. As shown, when receive amplifier bias voltage is switched to the "On" position it takes around 100 ns for the amplifier output to settle down to proper operation range. As expected, a peaking occurs during the transition of the amplifier output. This peak is nonetheless within the safe voltage limits of the transistors and thus does not represent a problem.

Typically, in mixed signal systems, i.e., those that incorporate both digital and analog circuitries in a single chip, the digital and analog power supplies and grounds are separated in the layout. This can be desirable because the switching noise of the digital circuitry may distort the analog circuitry. In this application, however, completely separating the digital and analog power supplies is not desirable because it would increase the number of electrical connections required.

In addition, the signal that is injected into the receiver circuitry from the switching of the pulser and the digital control circuitry, for example, is not a concern in practical pulse-echo operation. This is because for the first few hundred nanoseconds after the pulse, when the switching noise could affect the circuitry, the receiver is already overloaded with the acoustic coupling in the surface of the chip and, as a result, is not capable of processing reflected signals anyway. Regardless, as a first-order protection of the receiver amplifiers from the substrate noise, in a preferred embodiment, the high voltage pulsers and the low noise receiver electronics are surrounded by guard rings to isolate them from each other.

Figure 7:
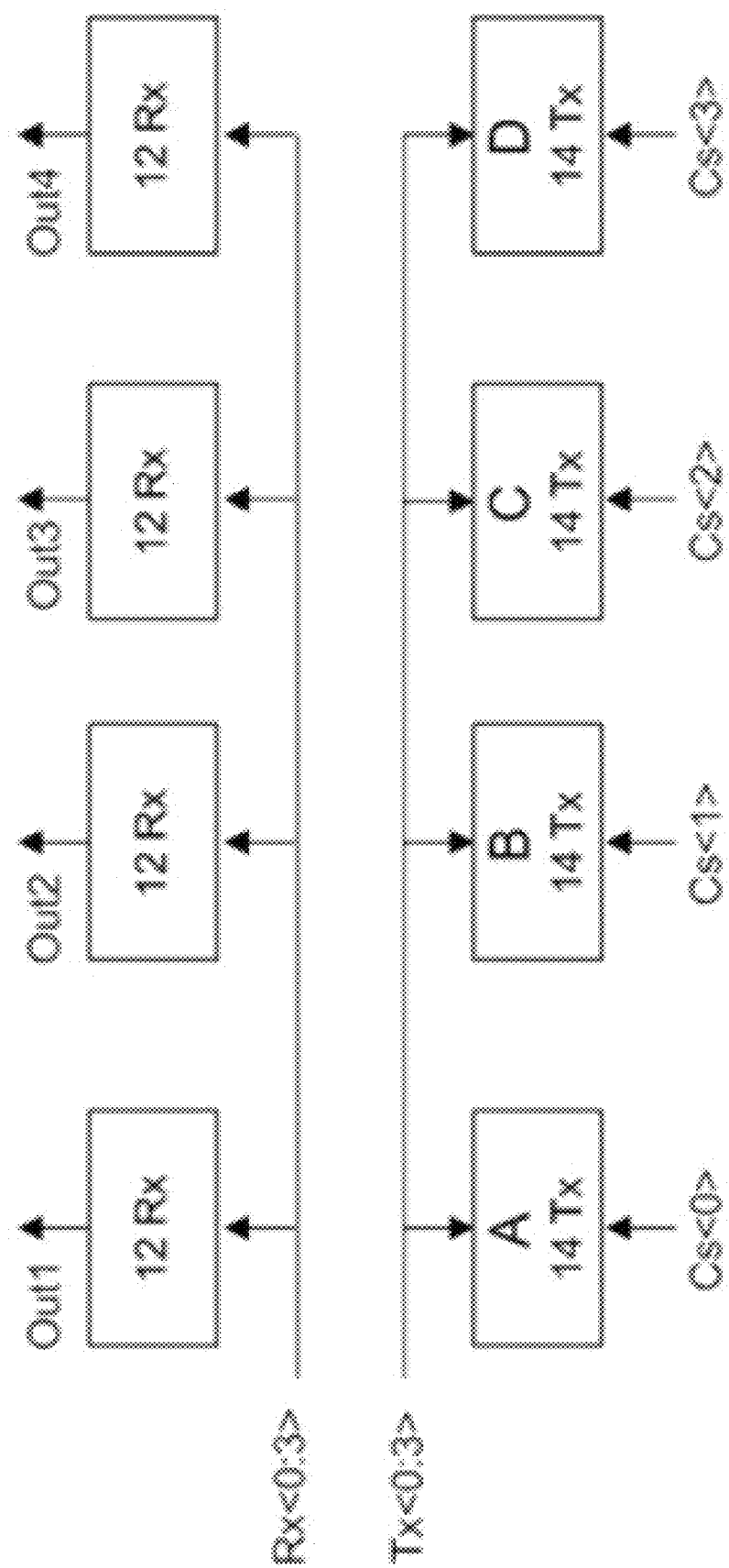
FIG. 7 is a schematic of digital control circuitry, in accordance with some embodiments of the present invention.

FIG. 7 depicts a top level view of the digital control circuitry, which can be used for synthetic phased array beamforming using a receiver CMUT ring array consisting of 48 receiver elements and a separate transmit CMUT ring array consisting of 56 transmit elements. In some embodiments, the FL-IVUS chip can consist of 4 sub-blocks for receive and each receive sub-block can contain 12 Rx channels. Of course, this configuration is, to a certain extent, space limited (i.e., maximized for the space restraints), but other configurations are possible and contemplated herein. In some embodiments, therefore, each receive sub-block can comprise 12 Rx channels. The 12 Rx channels can, in turn, be multiplexed through 4 multiplexer control bits and a single receive channel can be directed to its output at any given time. In this configuration, since there are 4 receive sub-blocks, a total of 4 receive elements can be routed to the 4 outputs of the chip simultaneously.

In a preferred embodiment, currently unselected demux outputs are actively pulled down to 0 V. This is preferable because it prevents current from flowing into pulsers that are not currently active. This would otherwise be a major source of power consumption. Consequently, in this configuration, the pulser outputs sit at high voltage when there is no trigger pulse at the pulser inputs.

Power Consumption

As discussed above, identifying the power consumption of individual components and functional blocks is important to understanding the power consumption of the system. In ultrasound imaging systems, although the transmitter circuitry generates high voltage pulses, because they are of short duration, they consume relatively little energy. The receiver circuitry, on the other hand, generally needs to be on for most of the imaging cycle. As a result, it is generally the receiver circuitry that consumes more power.

The power consumption of the transmitter can be estimated by considering the fact that each pulser discharges the load capacitance, the CMUT capacitance, which is charged from a high-voltage source. The energy stored in the capacitor is given by the expression:

$$E = \int VI dt = \int VC\frac{dv}{dt}dt = \int CV dv = \frac{CV^2}{2} \quad (3)$$

Thus, the dissipated power by the pulser is given by $$P = \frac{CV^2 f}{2} \quad (4)$$

where V is the peak-to-peak output voltage and f is the pulse repetition frequency (PRF).

Using a 25-V pulse amplitude, a 130-fF total load capacitance and a 20-µs repetition rate, which is appropriate for a 1.5-cm imaging depth, for example, the average power for each transmitter is 2.0 µW. Comparing this value with the 0.8-mW power consumption of the receive amplifier indicates that, in this application, transmit elements consume significantly less power than the receive amplifiers. The power consumption of the logic circuitry is also relatively low compared to the receive circuitry and can be ignored.

Table III shows the current consumption of the active preamplifiers and buffers separately along with the total chip power consumption. As discussed below, the average total power consumption of the chip can be kept below 20 mW by biasing off the unused receive amplifiers using the digital logic.

TABLE III

Relative Component Power Consumption

| A single TIA | 4 TIAs | 4 Buffers | Total Current Consumption | Total Power Consumption |
|---|---|---|---|---|
| 240 µA | ~1 mA | 4.8 mA | 5.8 mA | 19.2 mW |

Figure 8:
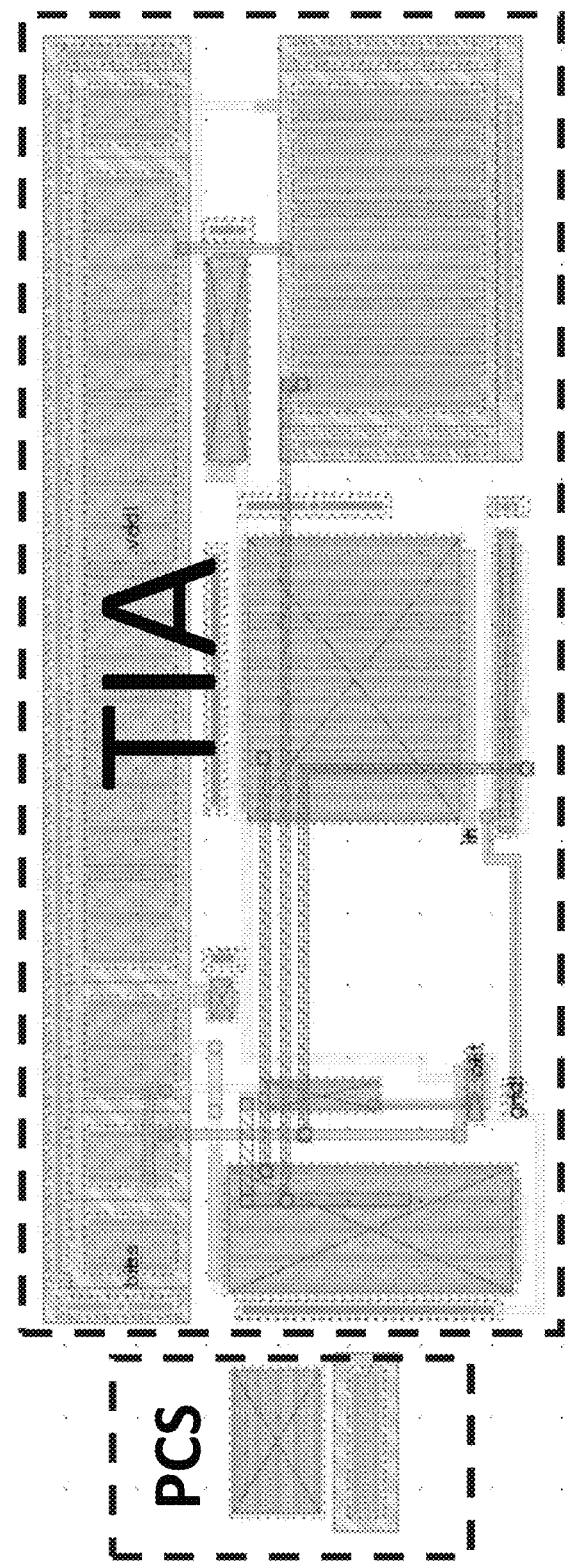
FIG. 8 is a schematic for a power control block, in accordance with some embodiments of the present invention.

In some embodiments, therefore, to reduce power consumption, the receive amplifiers that are not actively in use can be switched off. Thus, only four (of the 48 Rx) amplifiers will consume power at any given time, with the rest remaining inactive. In this configuration, power consumption can be reduced to approximately 1/12th of the original value, and well below the 150 mW limit even with large number of receiver TIAs. In some embodiments, power can be cut off from the Rx amplifiers by cutting the bias current. This can be done, for example and not limitation, by controlling the bias voltage through a digital switch that switches the bias voltage to "On" or "Off" position. This can be implemented, for example, by two MOS transistors and a controlling voltage. In some embodiments, the control voltage can be generated through the digital control circuitry, discussed above. FIG. 8 shows one possible configuration of the layout of a power control block next to a TIA. As shown, the area for control circuitry is very small and does not significantly affect the area requirements for the chip.

Integrated Temperature Sensing

In addition to intelligent power control, temperature feedback control can also be used as a redundant means for protecting the imaging probe against overheating. This is especially important when the probe is outside of the patient's body, for example, or to enable higher power consumption while imaging in the body, when necessary. In some embodiment, therefore, the system can further comprise a low-power CMOS temperature switch.

In some embodiments, the temperature sensor can generate a signal proportional to the absolute temperature of the probe. A comparator can then compare the signal with a reference (e.g., the signal at the maximum design temperature) and can output a switching signal. In some embodiments, the switch can be one or more MOS transistors. In a preferred embodiment, the MOS transistors can be operated in a subthreshold region, so that current consumption is very low. In this configuration, the power consumption can be as low as 10 µW, for example. In addition, the inaccuracy for this type of sensor is less than 2° C. and it consumes 0.04 mm².

In a preferred embodiment, the temperature threshold can be set to approximately 42° C. In this manner, if the imaging catheter is powered outside of the body and the temperature increases due poor heat conduction, for example, the sensor will shut the system Off at a safe temperature for the electronics. When inside the patient's body, on the other hand, the catheter is able to consumer more than 150 mW (e.g., for greater imaging penetration), since bodily fluids (e.g., blood) are effective heat sinks. In some embodiments, this can be exploited, for example and not limitation, to use more active channels to improve frame rate or image quality during operation of the FL imaging probe.

III. CMUT on CMOS Architecture

Embodiments of the present invention can also comprise optimized CMUT on CMOS chip architecture. In some embodiments, for example, synthetic phased array beamforming can be used to obviate the need for phase/delay generation circuits on the CMUT array chip. This approach can significantly reduce the complexity and area requirement of the chip. In this configuration, the main functions of the electronics become generation of high voltage transmit pulses, low noise amplification of the CMUT output current using TIAs, multiplexing the TIA outputs, buffering the selected channels to drive the cables, and digital circuitry to select and synchronize the transmit-receive firing events.

EXAMPLE 2

Figure 9:
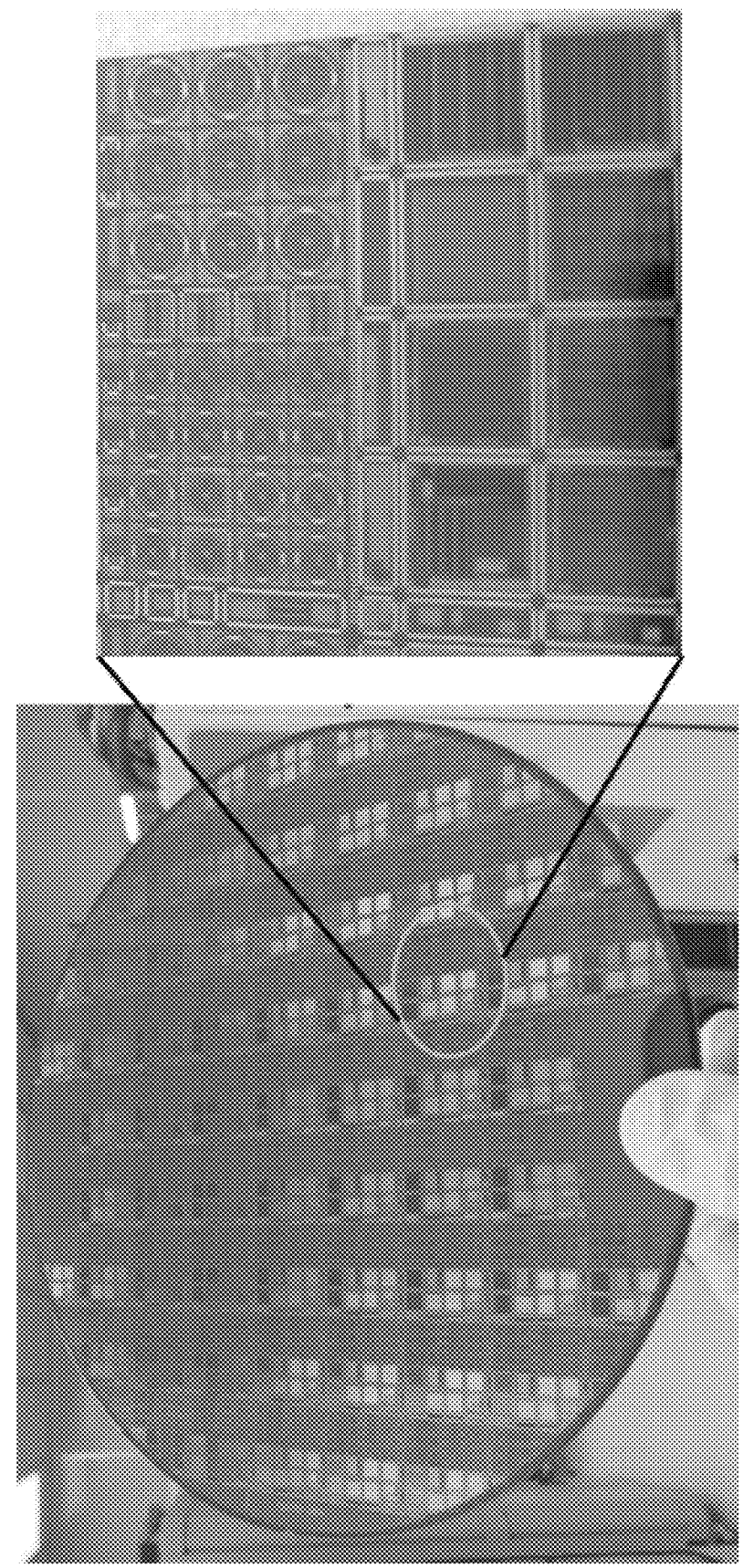
FIG. 9 depicts a custom designed CMOS wafer, in accordance with some embodiments of the present invention.

As shown in FIG. 9, to implement all of the necessary receive and transmit electronics in a single chip a 8-inch wafer reticle in 0.35-µm CMOS process can be custom-designed and manufactured. The ICs in this wafer can be custom designed for monolithic integration with forward-looking IVUS and intracardiac echocardiography ("ICE") arrays with diameters of 1.4 mm and 2 mm, respectively.

Figure 10:
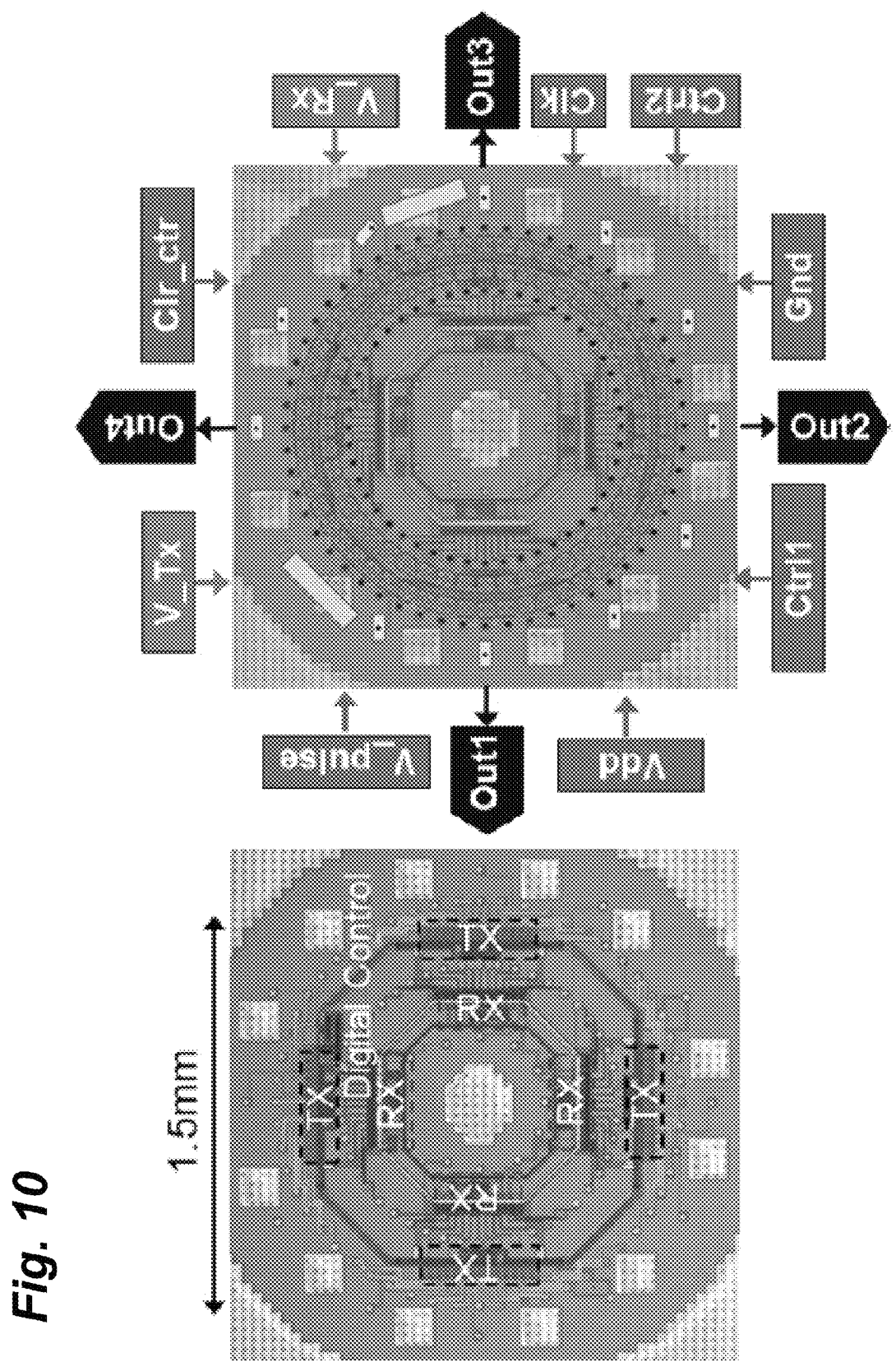
FIG. 10 depicts a CMUT on CMOS chip for ultrasound imaging, in accordance with some embodiments of the present invention.

FIG. 10 depicts a micrograph of one embodiment of the ICs 1700 designed for monolithic integration with a 1.4-mm diameter 20-MHz center frequency dual-ring array for FL-IVUS application. As shown, this IC 1700 incorporates 48 low-noise receiver amplifiers 1705 and 56 pulsers 1710 dedicated to each receive and transmit element in the array, respectively. The chip 1700 also includes buffers and a digital control circuitry 1720 that is designed to synchronize the transmitting and receiving sequence during the data acquisition. In this particular CMUT array, each element is approximately 70 μm×70 μm and the silicon nitride thickness is approximately 0.35 μm with a vacuum gap of approximately 0.16 μm. The CMUT array elements are designed with a 20 MHz center frequency and a 50% bandwidth, resulting in a frequency band between 15 MHz and 25 MHz. The CMUT element capacitance is calculated to be approximately 90 fF.

FIG. 10, also shows the external electrical connections to the imaging device. The data from 4 receive channels (Out1-4) can be collected in parallel. In some embodiments, the Clk input can have two functionalities. One function can be to increment the counter in the digital control circuitry, which, as discussed above, synchronizes the Rx and Tx functions, among other things. In some embodiments, however, the Clk input can also be used to generate the pulse trigger signal that is routed to the active pulser circuitry. Clr_ctr is the clear signal for the digital counter. V_pulse voltage input can control the magnitude of the high-voltage pulse. Ctrl1 and Ctrl2 can be the two control voltages used in the preamplifiers. In a preferred embodiment, two separate CMUT bias signals (V_Rx and V_Tx) can be provided for the separate receive and transmit CMUT rings.

As shown, the single-chip system requires a total of only 13 external connections, including Vdd (i.e., drain) and ground. In comparison, a conventional 64-element SL-IVUS catheter requires more than 200 chip-to-chip and chip-to-transducer electrical interconnect bonds and only provides a single output channel. The enormous advantage of this novel single-chip approach is apparent. In some embodiments, the single-chip system connections can be reduced to 8. This can be done, for example, by generating some of the bias signals internally and/or avoiding the need for clearing the counter.

As discussed above, synthetic beamforming and data acquisition can be used to obviate the need for delay generation circuits. This is because, to cover a 3D volume, an excessive number of steered ultrasound beams are required. Thus, the delay would increase the data acquisition time significantly, which would increase the susceptibility to tissue-catheter motion artifact. In addition, beam forming circuitry would considerably increase chip complexity making it more challenging to meet the stringent area and power requirements.

For a dual-ring array, the resolution does not depend on which ring is used as the transmitter or receiver. The choice between implementing a 56TX/48RX configuration or a 48TX/56RX configuration can be made based on area optimization. The inner ring, with a smaller number of available elements, for example, can be assigned to the electronics block (receive amplifier or transmit pulser) that consume more area on the chip. In this design, however, the area of the implemented transmit pulser is substantially similar to the area of the designed receive amplifier. As a result, a 56TX/48RX configuration is chosen arbitrarily.

An additional advantage of CMUT-on-CMOS integration is that there is no need for wire bonding to the CMOS IC. As a result, a wire bonding pad structure is not needed, which consumes considerable area on the chip. It should be noted, however, that the pad structures generally also contain electrostatic discharge ("ESD") protection circuitries. As a result, while the chips described herein remain functional during prolonged experiments, ESD protection can be added to meet industry standards where necessary.

As shown in FIG. 10, some areas of the center and the perimeter of the IC are left free of metal traces and active CMOS circuitry. This can enable etching through the silicon substrate, for example, to create the final donut shape suitable for placement on a tip of a circular catheter. The diameter of the gap 1725 at the center of the chip is approximately 430-μm, which is the diameter of a typical guide wire. Of course, this can be varied depending on the application. In this embodiment, the active circuitry and the CMUT array fit under a 1.5-mm diameter silicon donut. The connection areas shown outside the diameter of the CMUT array are merely for initial testing and can be omitted.

For comparison, the only commercially available IVUS system, which is side-looking, that integrates the ICs inside the catheter uses amplifiers with an input-referred current-noise level around 1.3 pA/√Hz and on-chip transmitters that provide 10-V pulses. Compared to this commercial system, the 220-fA/√Hz input-referred current-noise level and the 25-V pulse system used herein represent a possible 15× improvement in the system SNR. In addition, the side-looking system in requires multiple connections between the array and the separate ICs, which makes the catheter assembly very challenging. These connections are obviated using the CMUT on CMOS technology discussed herein.

Embodiments of the present invention also obviate the need for, for example and not limitation, through-wafer vias, flip-chip bonding to a flexible PCB, or solder interconnects. These conventional wire bonding techniques require, for example, 80-μm and 60-μm solder balls, which themselves consume considerable area. In contrast, using the monolithic integration approach disclosed herein, the connections between the CMOS chip and the CMUT level can be made through stacked metal layers that consume a much smaller 25×25 μm area. In addition, it is possible to eliminate the need for the layout area dedicated to the CMUT connections because the CMUT-CMOS connections can be done using the topmost metal level, for example, which can, in some embodiments, be directly on top of the active CMOS circuitry. As a result, eliminating the interconnects for 56Tx and 48Rx connections, among other things, provides substantial area savings on the chip.

Conventional systems may also require 100 or more cables to provide all the electrical connections to the IC's. This can be, for example, because there is no multiplexing and all output channels are transmitted over separate connections. In contrast, embodiments of the present invention can comprise a single-chip system using multiplexers, as in FIG. 10 that requires only 13 connections. Conventionally, each transducer element is also used for both transmit and receive. As a result, there is a need for a Tx/Rx switch for each transducer element. Embodiments of the present invention, however, incorporate a dual-ring array with separate transducer rings for transmit and receive operations. In this configuration, there is no need for a switch to isolate the transmitter-receiver electronics. In addition, eliminating the need for noisy protection switches helps improve SNR for the circuit. Obviously, eliminating tens or hundreds of switches, including high-voltage protection circuitry, also saves considerable area on the chip. Conventional protection circuitry, for example, generally consumes almost ⅓rd of the total area for the pulser-receiver circuitry for each transducer.

Embodiments of the present invention, therefore, relate to a single-chip system for forward-looking IVUS imaging. The fully-integrated system includes both high-voltage pulser and low-noise receiver circuitry dedicated to each Tx and Rx array element on the array. This novel single-chip integration reduces the interconnect complexity significantly, and enables the significant miniaturization of the FL-IVUS array. The system fits into a 1.5-mm diameter donut shape suitable for placement on the tiny tip of a FL-IVUS catheter.

While several possible embodiments are disclosed above, embodiments of the present invention are not so limited. For instance, while several possible components, chip layouts, and logic schemes have been disclosed, other suitable components, materials, and layouts could be selected without departing from the spirit of the invention. In addition, the location and configuration used for various features of embodiments of the present invention can be varied according to a particular application or imaging need that requires a slight variation due to, for example, the materials used and/or space or power constraints. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A CMUT on CMOS chip for forward-looking imaging applications comprising:
   a CMOS chip comprising:
      a plurality of CMUT transmit elements and associated driving circuitry on a planar top surface of the CMOS chip, the plurality of CMUT transmit elements configured to transmit an ultrasonic signal incident on a desired volume to be imaged, wherein the desired volume to be imaged comprises a volume opposite the planar top surface;
      a plurality of CMUT receive elements and associated detection circuitry on the planar top surface of the CMOS chip, the plurality of CMUT receive elements configured to receive an ultrasonic signal reflected by the desired volume to be imaged; and
      a digital control unit;
   wherein the digital control unit cycles the plurality of transmit elements on and off in a first sequence;
   wherein the digital control unit cycles the plurality of receive elements on and off in a second sequence; and
   wherein the digital control unit cycles the transmit and receive elements on and off until a predetermined number of transmit and receive elements have been cycled.

2. The CMUT on CMOS chip of claim 1, wherein the first sequence cycles through the plurality of transmit elements one at a time.

3. The CMUT on CMOS chip of claim 1, wherein the first sequence cycles through the plurality of transmit elements two or more at a time.

4. The CMUT on CMOS chip of claim 3, wherein the second sequence cycles through the plurality of receive elements four at a time.

5. The CMUT on CMOS chip of claim 1, wherein the second sequence cycles through the plurality of receive elements two or more at a time.

6. The CMUT on CMOS chip of claim 1, wherein the second sequence cycles through the plurality of receive elements two or more at a time and all the receive electronics for non-selected receiver elements are turned off.

7. The CMUT on CMOS chip of claim 1, wherein the digital control unit comprises a multi-bit counter.

8. The CMUT on CMOS chip of claim 1, wherein the predetermined number is reached when all of the transmit and receive elements have been cycled on and off.

9. The CMUT on CMOS chip of claim 1, wherein the predetermined number is reached when between approximately 10 to 80 percent of the transmit and receive elements have been cycled on and off.

10. The CMUT on CMOS chip of claim 1, further comprising 13 or fewer external connections for data input, data output, and power.

11. The CMUT on CMOS chip of claim 1, further comprising eight external connections for data input, data output, and power.

12. The CMUT on CMOS chip of claim 1, further comprising:
   a temperature sensor; and
   a switch;
   wherein, when the temperature sensor reaches a predetermined temperature, the switch interrupts power to the CMOS chip to prevent overheating.

13. The CMUT on CMOS chip of claim 1, wherein each transmit element in the plurality of CMUT transmit elements transmits an ultrasonic signal incident on a substantial portion of the desired volume to be imaged.

14. The CMUT on CMOS chip of claim 1, wherein each receive element in the plurality of CMUT receive elements receives ultrasonic signals reflected by a substantial portion of the desired volume to be imaged.

15. The CMUT on CMOS chip of claim 1, wherein the plurality of CMUT transmit elements are configured in a first ring, and the plurality of receive elements are configured in a second ring, and wherein the first ring and the second ring are concentric.

16. The CMUT on CMOS chip of claim 1, wherein at least a portion of the desired volume to be imaged is coplanar with the top surface of the CMOS chip.

17. A CMUT on CMOS chip for forward-looking imaging applications comprising:
   a CMOS chip having a planar top surface comprising:
      a first ring comprising a plurality of CMUT transmit elements disposed on the planar top surface and proximate an outer edge of the CMOS chip, wherein the plurality of CMUT transmit elements are configured to transmit an ultrasonic signal incident on a desired volume to be imaged, wherein the desired volume to be imaged comprises a volume opposite the planar top surface;
      a second ring comprising a plurality of CMUT receive elements disposed on the planar top surface and proximate the outer edge of the CMOS chip wherein the plurality of CMUT receive elements are configured to receive an ultrasonic signal reflected by the desired volume to be imaged; and
      a digital control unit;
   wherein the digital control unit activates the CMUT transmit elements one at a time to transmit an ultrasonic signal;
   wherein the digital control unit activates the CMUT receive elements in groups to receive the ultrasonic signal; and
   wherein an imaging cycle is complete when a predetermined number of transmit and receive elements have been activated.

18. The CMUT on CMOS chip of claim 17, wherein the first ring is disposed outside the second ring.

19. The CMUT on CMOS chip of claim 17, wherein the second ring is disposed outside the first ring.

20. The CMUT on CMOS chip of claim 17, wherein the CMUT receive elements are activated in groups of four or more.

21. A method for providing energy-efficient ultrasound imaging comprising:
 providing a CMOS chip having a planar top surface comprising:
  a first ring comprising a plurality of CMUT transmit elements disposed on the planar top surface and proximate an outer edge of the CMOS chip, wherein the plurality of CMUT transmit elements are configured to transmit an ultrasonic signal incident on a desired volume to be imaged, wherein the desired volume to be imaged comprises a volume opposite the planar top surface;
  a second ring comprising a plurality of CMUT receive elements disposed on the planar top surface and proximate the outer edge of the CMOS chip, wherein the plurality of CMUT receive elements are configured to receive an ultrasonic signal reflected by the desired volume to be imaged;
 cycling the plurality of transmit elements on and off in a first sequence; and
 cycling the plurality of receive elements on and off in a second sequence;
 wherein an imaging cycle is complete when a predetermined number of transmit and receive elements have been activated.

22. The method of claim 21, wherein the second sequence cycles the receive elements on and off two or more at a time.

23. The method of claim 21, wherein the predetermined number is reached when all of the transmit and receive elements have been cycled on and off.

24. The method of claim 21, wherein the predetermined number is reached when approximately 10 to 80 percent of the transmit and receive elements have been cycled on and off.

25. The method of claim 21, further comprising:
 sensing the temperature of the CMOS chip with a temperature sensor; and
 turning the receive elements, the transmit elements, or both, off at a predetermined temperature.

26. The method of claim 25, wherein the predetermined temperature is between 35 and 50 degrees Celsius.

\* \* \* \* \*